US012809237B2

(12) United States Patent
Thompson et al.

(10) Patent No.: US 12,809,237 B2
(45) Date of Patent: Nov. 24, 2026

(54) REMOVABLE THERMAL IMAGING CAMERA

(71) Applicant: 3M INNOVATIVE PROPERTIES COMPANY, St. Paul, MN (US)

(72) Inventors: Darin K. Thompson, Huntersville, NC (US); Longin J. Kloc, Charlotte, NC (US); Johnathan R. Graves, Gainesville, GA (US); Traian Morar, Matthews, NC (US); William B. Howell, Pineville, NC (US)

(73) Assignee: 3M Innovative Properties Company, St. Paul, MN (US)

( * ) Notice: Subject to any disclaimer, the term of this patent is extended or adjusted under 35 U.S.C. 154(b) by 124 days.

(21) Appl. No.: 18/861,490

(22) PCT Filed: Apr. 27, 2023

(86) PCT No.: PCT/IB2023/054330

§ 371 (c)(1),
(2) Date: Oct. 29, 2024

(87) PCT Pub. No.: WO2023/214255

PCT Pub. Date: Nov. 9, 2023

(65) Prior Publication Data

US 2025/0291238 A1 Sep. 18, 2025

Related U.S. Application Data

(60) Provisional application No. 63/338,243, filed on May 4, 2022.

(51) Int. Cl.
*G03B 17/56* (2021.01)
*G03B 17/02* (2021.01)
(Continued)

(52) U.S. Cl.
CPC ........... *G03B 17/561* (2013.01); *G03B 17/02* (2013.01); *G03B 29/00* (2013.01); *H04N 23/11* (2023.01);
(Continued)

(58) Field of Classification Search
CPC ...... G03B 17/561; G03B 17/02; G03B 29/00; H04N 23/54; H04N 23/52; H04N 23/11; H04N 23/55
(Continued)

(56) References Cited

U.S. PATENT DOCUMENTS

2003/0122958 A1 7/2003 Olita
2016/0253561 A1 9/2016 Foley et al.
(Continued)

FOREIGN PATENT DOCUMENTS

WO 2010033131 A1 3/2010
WO 2020112184 A1 6/2020
WO 2022079551 A1 4/2022

OTHER PUBLICATIONS

International Search Report for PCT International Application No. PCT/IB2023/054330, mailed on Aug. 9, 2023, 4 pages.

*Primary Examiner* — Joel W Fosselman
(74) *Attorney, Agent, or Firm* — Shumaker & Sieffert, P.A.

(57) ABSTRACT

A mounting system for an image capture device includes an adapter that has a first mating member, and a housing releasably coupled to the adapter. The housing includes a latching mechanism that has a second mating member sized and configured to receive the first mating member of the adapter when the housing member is coupled to the adapter, and a biasing element projecting from an outer surface of the housing. The biasing element is movably coupled to the
(Continued)

housing and is transitionable between a first disengaged position and a second engaged position.

13 Claims, 11 Drawing Sheets

(51) Int. Cl.
*G03B 29/00* (2021.01)
*H04N 23/11* (2023.01)
*H04N 23/52* (2023.01)
*H04N 23/54* (2023.01)
*H04N 23/55* (2023.01)

(52) U.S. Cl.
CPC ............ *H04N 23/52* (2023.01); *H04N 23/54* (2023.01); *H04N 23/55* (2023.01)

(58) Field of Classification Search
USPC ........................................................ 396/428
See application file for complete search history.

(56) References Cited

U.S. PATENT DOCUMENTS

| | | | | |
|---|---|---|---|---|
| 2018/0292178 | A1* | 10/2018 | Gehring | F41G 11/003 |
| 2019/0230258 | A1 | 7/2019 | Phillips | |
| 2021/0059344 | A1 | 3/2021 | Ralston et al. | |
| 2022/0128823 | A1 | 4/2022 | Baudou et al. | |

* cited by examiner

REMOVABLE THERMAL IMAGING CAMERA

CROSS REFERENCE TO RELATED APPLICATIONS

This application is a national stage filing under 35 U.S.C. 371 of PCT/IB2023/054330, filed 27 Apr. 2023, which claims the benefit of U.S. Provisional Patent Application No. 63/338,243, filed 4 May 2022, the disclosure of which is incorporated by reference in its/their entirety herein.

TECHNICAL FIELD

This disclosure relates to an apparatus and system, and related methods of use thereof, for a mounting system for an image capture device.

INTRODUCTION

Imaging cameras are used in a wide variety of applications. However, imaging cameras are typically specific to a particular implementation and are expensive. For example, equipment used by a first responder that includes an imaging device is typically manufactured with the imaging device integrated into the equipment. As such, even though an organization may have many pieces of a particular type of equipment, e.g., respirator mask, that are assigned to a specific user, there may be times where the user is not working and thus the associated expensive imaging device sits idle. Existing equipment devices and systems do not have the ability to mount the same imaging camera on various platforms, objects, surfaces, or fixtures.

SUMMARY

Certain conditions and cost considerations may require the use of an imaging camera that can be readily movable and releasably coupled to various platforms, objects, surfaces, or fixtures. Some embodiments advantageously provide a method and system for a mounting system for an image capture device. The mounting system includes an adapter that has a first mating member, and a housing releasably coupled to the adapter. The housing includes a latching mechanism that has a second mating member sized and configured to receive the first mating member of the adapter when the housing member is coupled to the adapter, and a biasing element projecting from an outer surface of the housing. The biasing element is movably coupled to the housing and is transitionable between a first disengaged position and a second engaged position.

BRIEF DESCRIPTION OF THE DRAWINGS

A more complete understanding of embodiments described herein, and the attendant advantages and features thereof, will be more readily understood by reference to the following detailed description when considered in conjunction with the accompanying drawings wherein.

DETAILED DESCRIPTION

Figure 1:
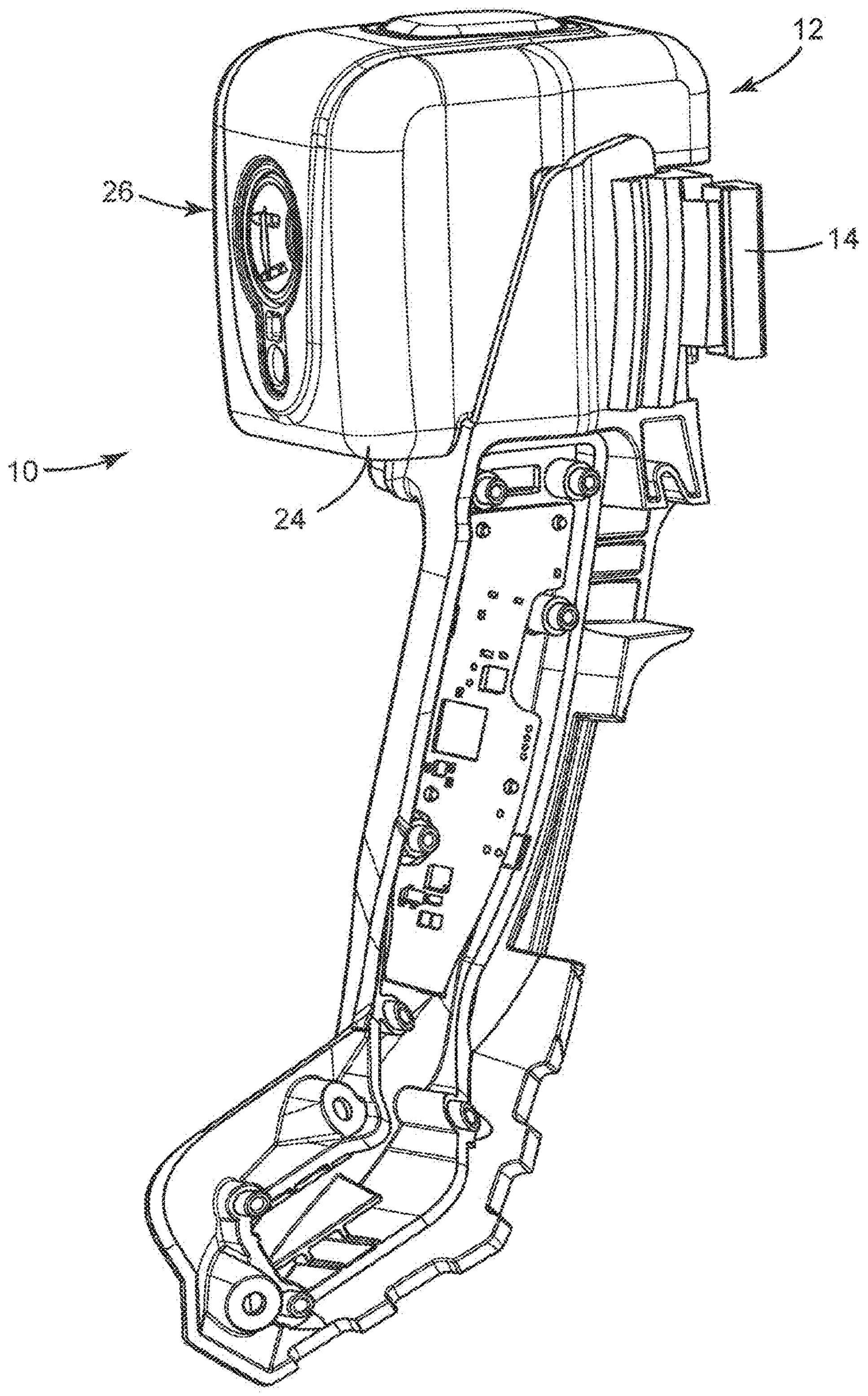
FIG. 1 is a perspective view of a mounting system for an image capture device constructed in accordance with the principles of the present application.

Before describing in detail exemplary embodiments, it is noted that the embodiments reside primarily in combinations of apparatus components and processing steps related to a device and system, and methods thereof, for mounting an image capture device. Accordingly, the device, system, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

As used herein, relational terms, such as “first” and “second,” “top” and “bottom,” and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms “a”, “an” and “the” are intended to include the plural forms as well, unless the context clearly indicates otherwise. It will be further understood that the terms “comprises,” “comprising,” “includes” and/or “including” when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In embodiments described herein, the joining term, “in communication with” and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In embodiments described herein, the term "field of view" (FOV) refers to the maximum area of a sample that a camera can image.

Figure 7:
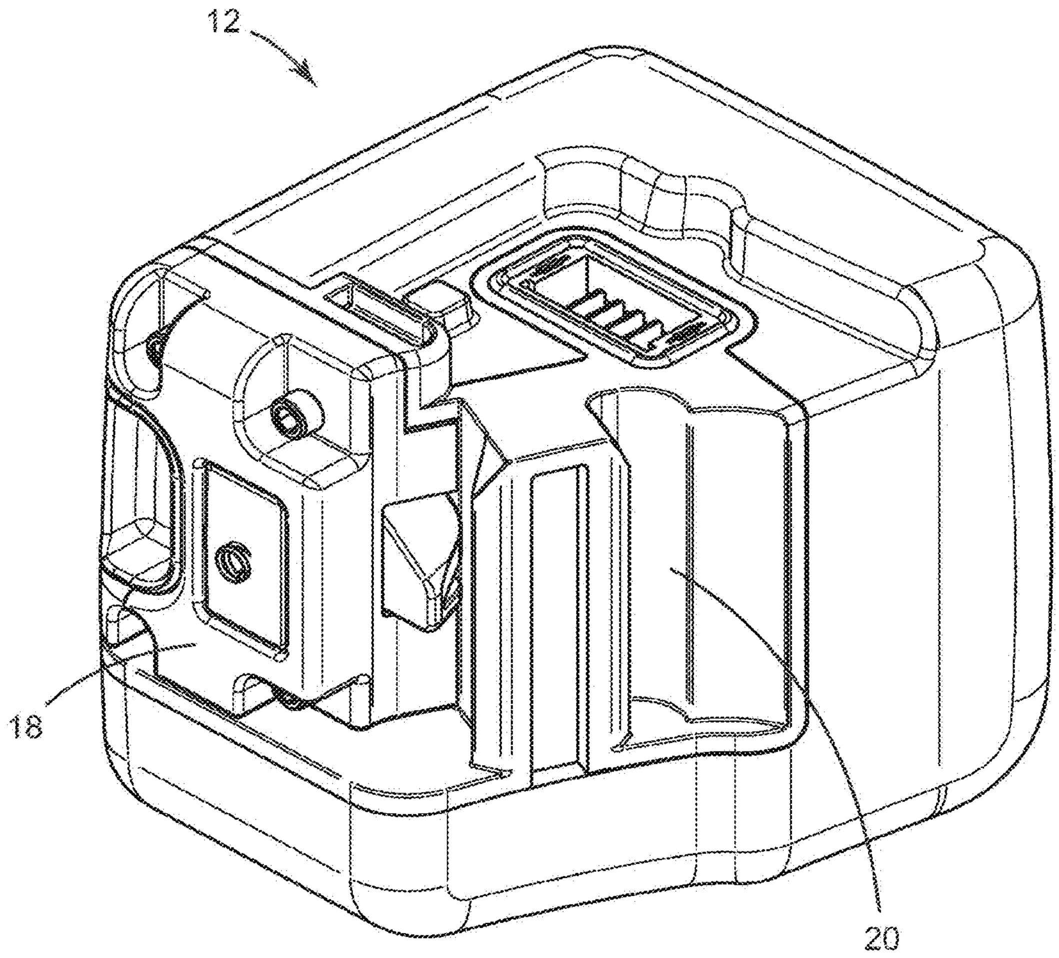
FIG. 7 is a perspective view of the image capture device of FIGS. 1-2B.
Figure 8:
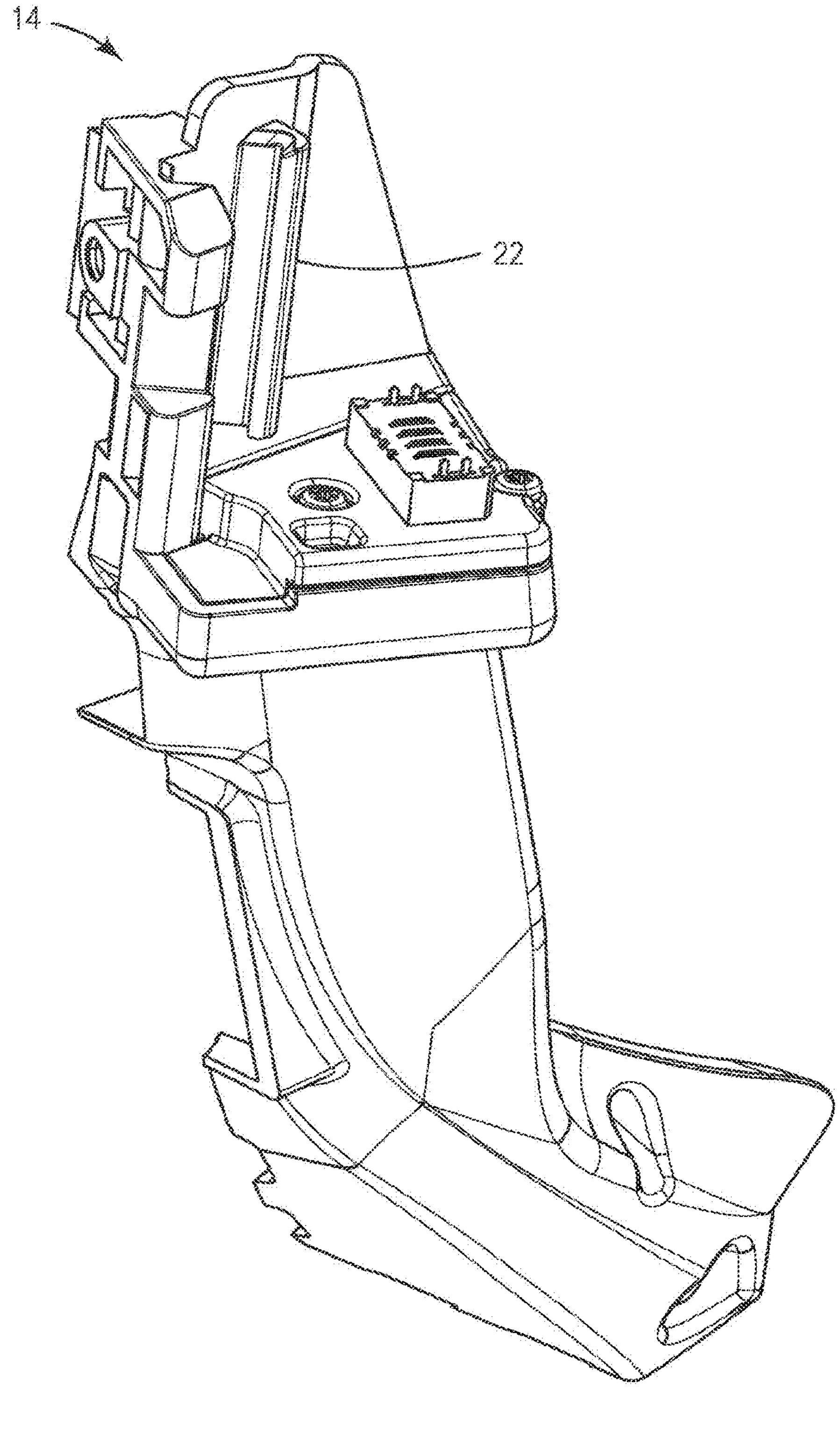
FIG. 8 is a perspective view of the adapter of FIG. 1-2B.

Some embodiments include a system 10 for mounting or otherwise releasably coupling an image capture device 12 to a corresponding adapter 14 that itself is coupled to any desired object, fixture, or surface that includes the adapter 14, such as, for example, a self-contained breathing apparatus (SCBA), aerial ladder, light boom, helmet, facemask, armband, vest, drone, and/or the handle for a mobile and/or smart device. For example, as shown in FIGS. 1-5, the image capture device 12 may include a housing 16 (shown in FIGS. 3 and 7) that has a latching mechanism 18. The housing 16 may include a mating member 20 that is configured to engage and releasably couple the mating member 20 to a mating member 22 of the adapter 14 (as shown in FIG. 8). In one or more embodiments, the mating member 20 of the latching mechanism 18 is sized and configured to receive the mating member 22 of the adapter 14 when the housing 16 is coupled to the adapter 14. As shown in FIG. 1, the image capture device 12 may also include a boot 24 sized and configured to at least partially encase the housing 16. The boot 24 and/or the housing 16 may each be composed of a durable drop-resistant, water-resistant, and/or thermally-resistant material that can withstand extreme heat and cold temperature conditions in the event of a fire, snowstorm, blizzard, rainstorm, or flood. In some embodiments, the boot 24 may be composed of a material such as silicone, rubber, and the like. As shown in FIG. 1, the housing 16 and boot 24 define an aperture 26 that circumscribes a lens 28 (discussed in more detail below and shown in FIGS. 3 and 4A) of the image capture device 12. The aperture 26 allows for an opening through which the lens 28 can have a field of view that is not obstructed by the surfaces of the housing 16 and boot 24, and capture an image that is within the field of view.

Figure 2A:
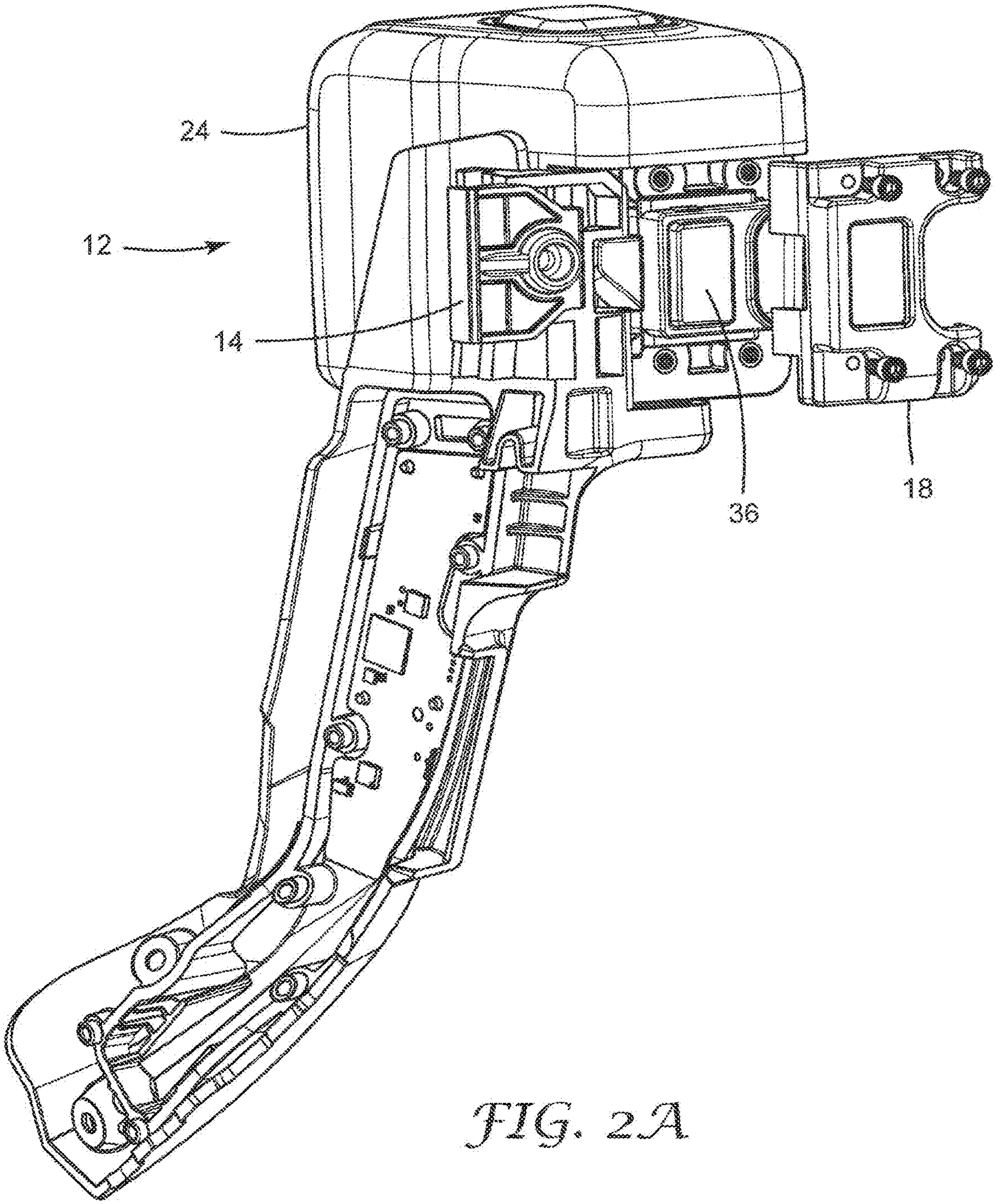
FIG. 2A is an exploded view of the mounting system of FIG. 1 in which a latching mechanism of the image capture device may engage a corresponding adapter.
Figure 2B:
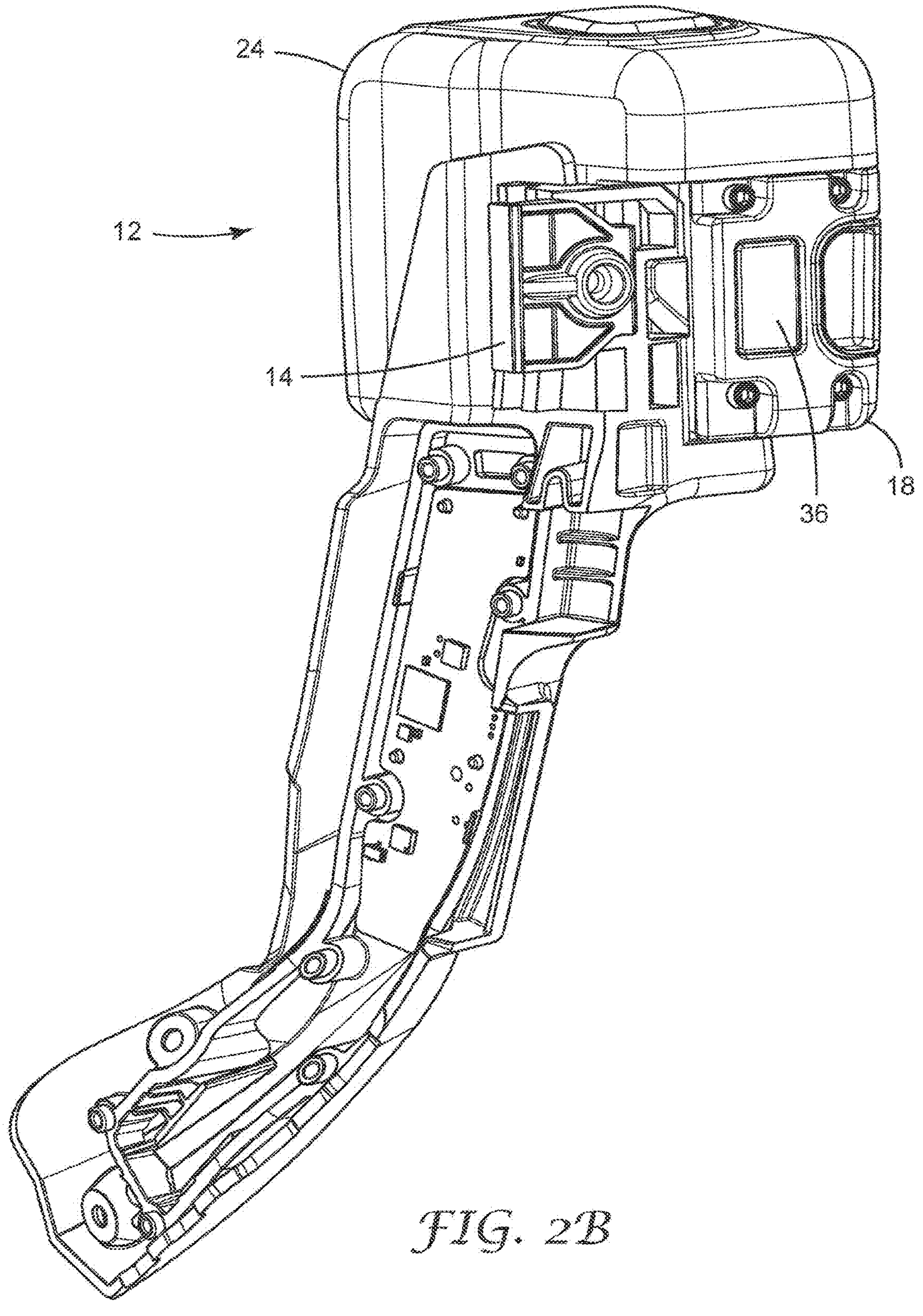
FIG. 2B shows the engagement of the latching mechanism and the corresponding adapter of FIGS. 1-2A.

Now referring to FIGS. 2A-2B, the engagement and coupling of the image capture device 12 and corresponding adapter 14 is shown. Although the adapter 14 is shown as being coupled, attached, or otherwise affixed to the boom portion of a facepiece for personal protective equipment (PPE), it is to be understood that the adapter 14 may also be coupled, attached, or affixed to any other platform, object, fixture, or surface configured to retain or include the adapter 14. As shown in FIG. 2B, in one or more embodiments, the mating member 20 of the latching mechanism 18 is a channel, slot, open lumen, or groove defined by an outer surface 32 of the housing 16 and is sized and configured to receive the mating member 22 of the adapter 14.

The latching mechanism 18 may include a biasing element 34 projecting from the outer surface 32 of the housing 16. The biasing element 34 may be movably coupled to the housing 16 such that it is transitionable between a disengaged position and an engaged position. As a non-limiting example, the biasing element 34 may be a spring that is coupled to a flange or tab 36. To couple the image capture device 12 to the adapter 14, a user may exert force or pressure on the tab 36 to compress the biasing element 34 which is in a disengaged or relaxed position. The compression of the biasing element 34 transitions the biasing element 34 from the disengaged position to the engaged position, and thereby increases the width (i.e., widens) the groove 20. The widening of the groove 20 allows for the groove 20 to slidingly receive the mating member 22 of the adapter 14, which is a protrusion, stem, surface, or other piece sized and configured to be retained within the groove 20.

Once the mating member 22 of the adapter 14 is inserted and received within the groove 20 of the latching mechanism 18, the pressure or force on the tab 36 may be released which transitions the biasing element 34 from the engaged position to the disengaged position and allows the groove 20 to the return from the widened configuration to its original configuration and releasably lock the adapter 14 into place such that image capture device 12 is releasably affixed to the adapter 14. The locking of the adapter 14 into place also prevents displacement, or unwanted movement or shaking, of the image capture device 12 when affixed to the adapter 14 during use.

Figure 3:
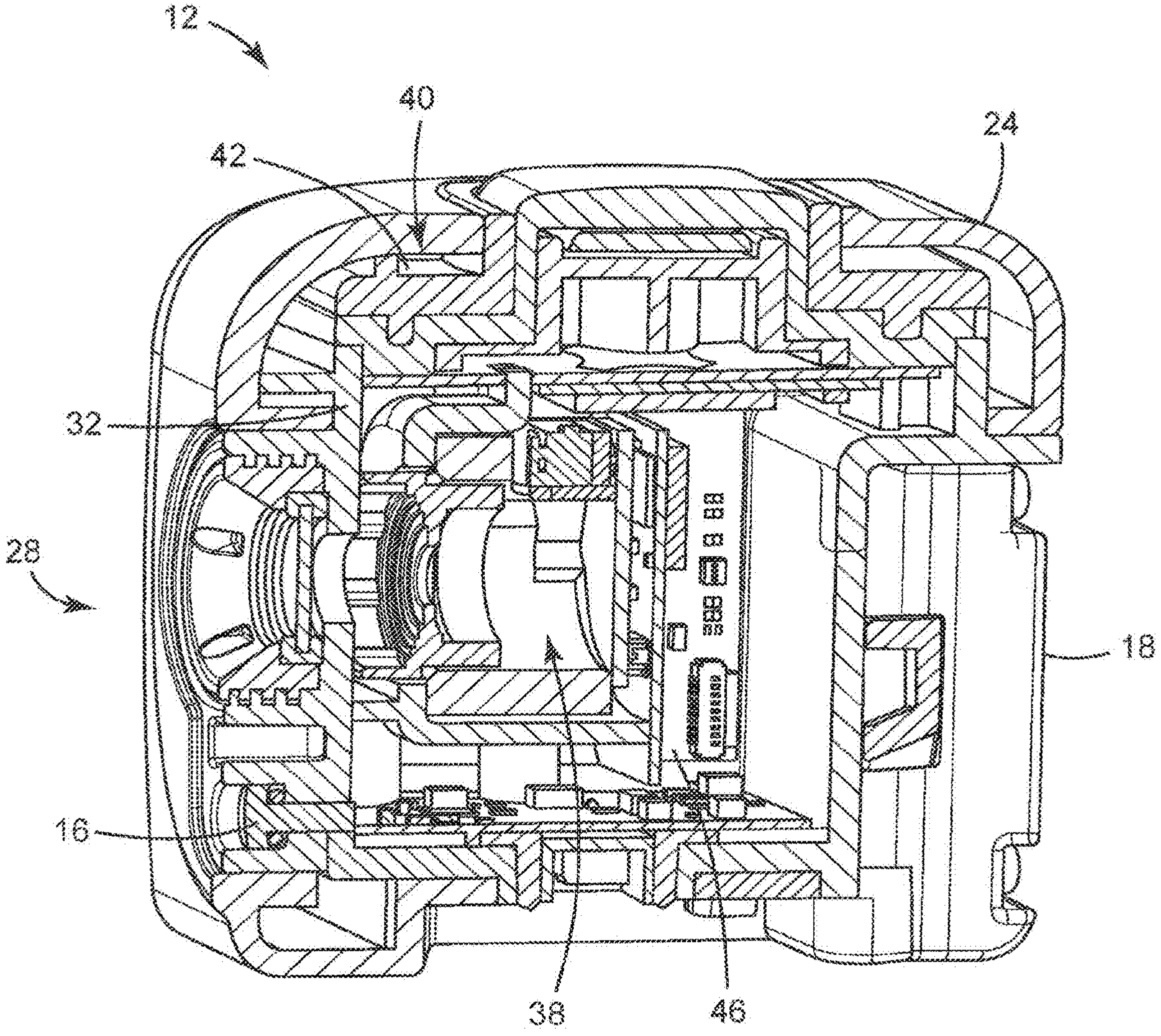
FIG. 3 shows a sectional view of the image capture device of FIGS. 1-2B.
Figure 9:
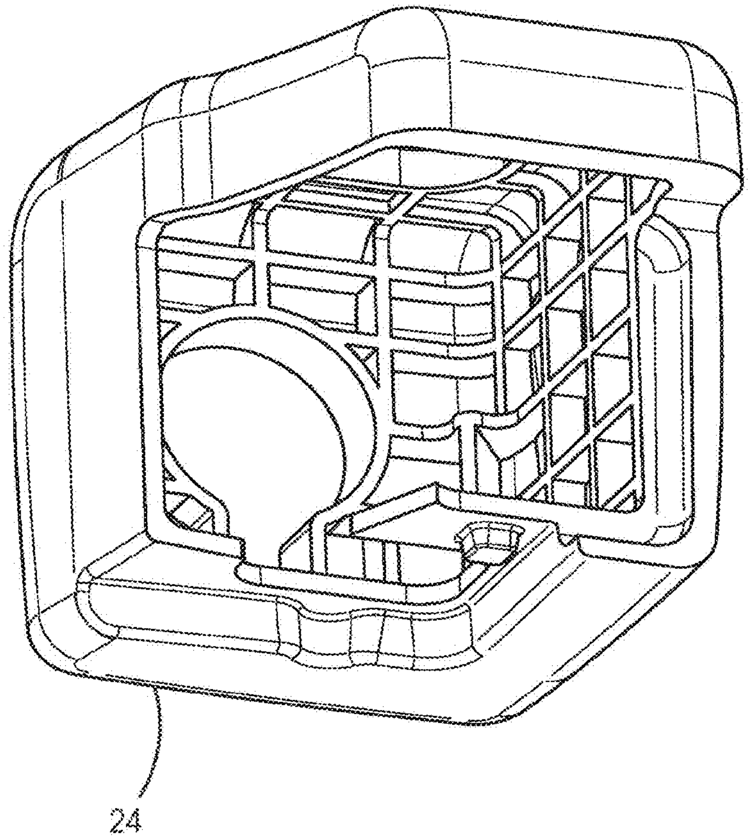
FIG. 9 is a perspective view of a housing exhibiting a “waffle” shape.

Now referring to FIG. 3, the boot 24 is shown at least partially encasing the housing 16. Within the housing 16, the image capture device 12 further includes a camera assembly 38. The boot 24 may partially or fully encase the housing 16, thereby protecting the camera assembly 38 from thermal conditions and other conditions prevalent in the ambient environment. As shown in FIG. 3, an inner surface 40 of the boot 24 and the outer surface 32 of the housing 16 may define a gap 42 therebetween that provides at least partial separation of the outer surface 32 of the housing 16 from the inner surface 40 of the boot 24. The gap 42 provides both a thermal barrier, shock absorption for impact and/or drop protection, and facilitates assembly. Additionally, as shown in FIG. 9, in some embodiments, the housing 16 may have a "waffle"-shape 30 that provides a thermal barrier, shock absorption for impact and/or drop protection, and facilitates assembly.

Figure 4A:
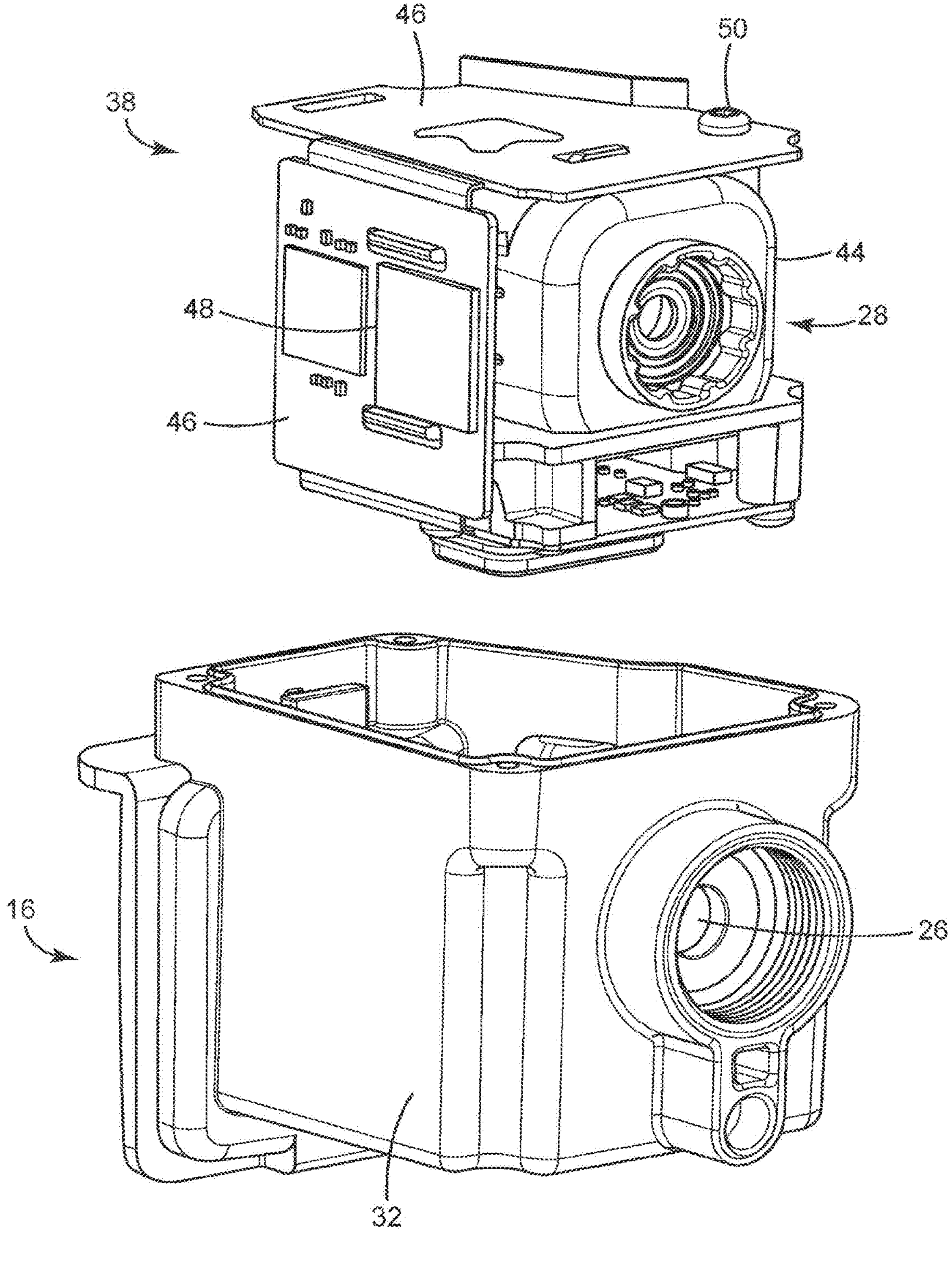
FIG. 4A is an exploded view of the mounting system of FIGS. 1-3 in which a camera assembly is disposed within a housing.
Figure 4B:
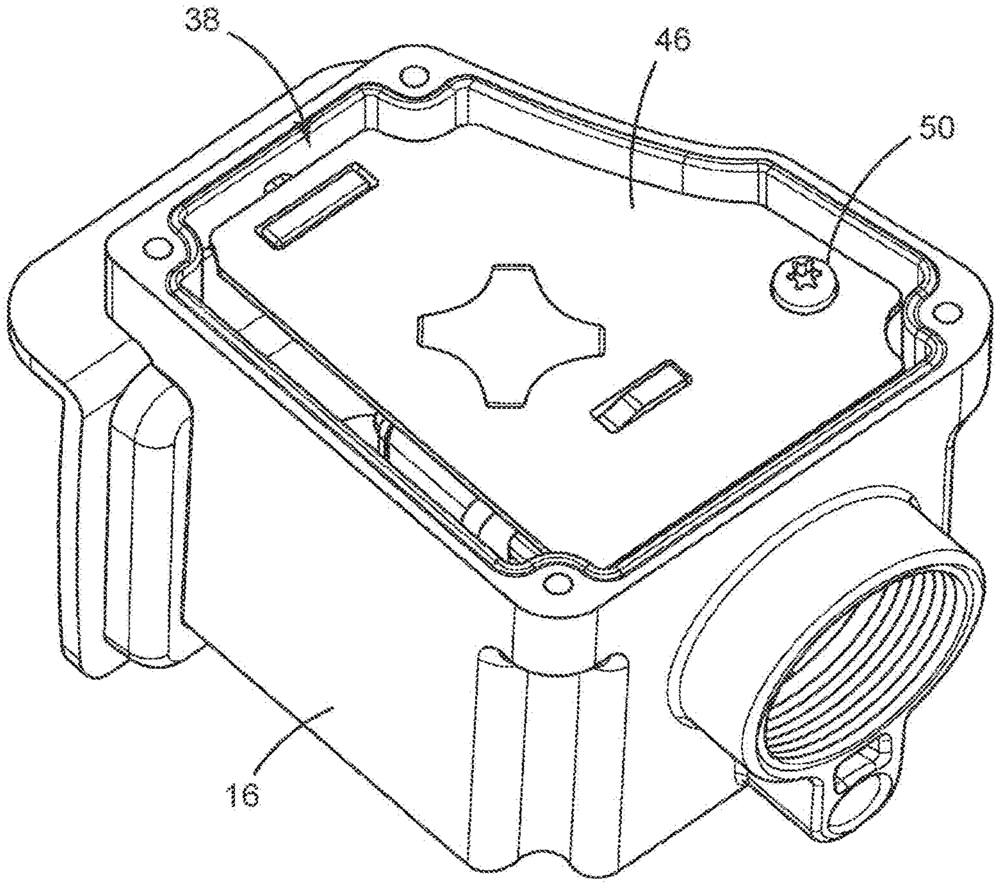
FIG. 4B shows the insertion of the camera assembly into the housing of FIGS. 1-4A.
Figure 5:
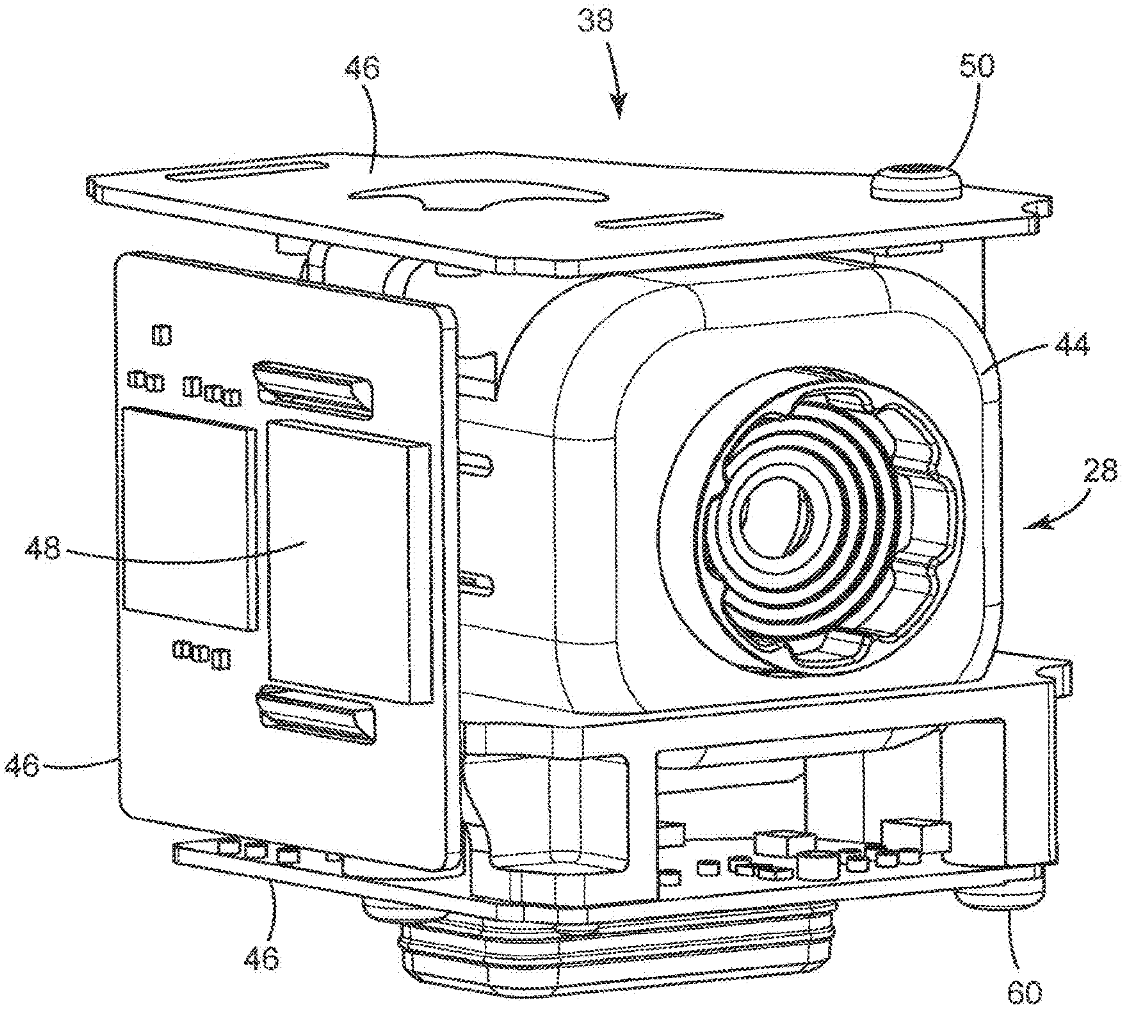
FIG. 5 is a perspective view of a camera assembly of the image capture device of FIGS. 1-4B.
Figure 6:
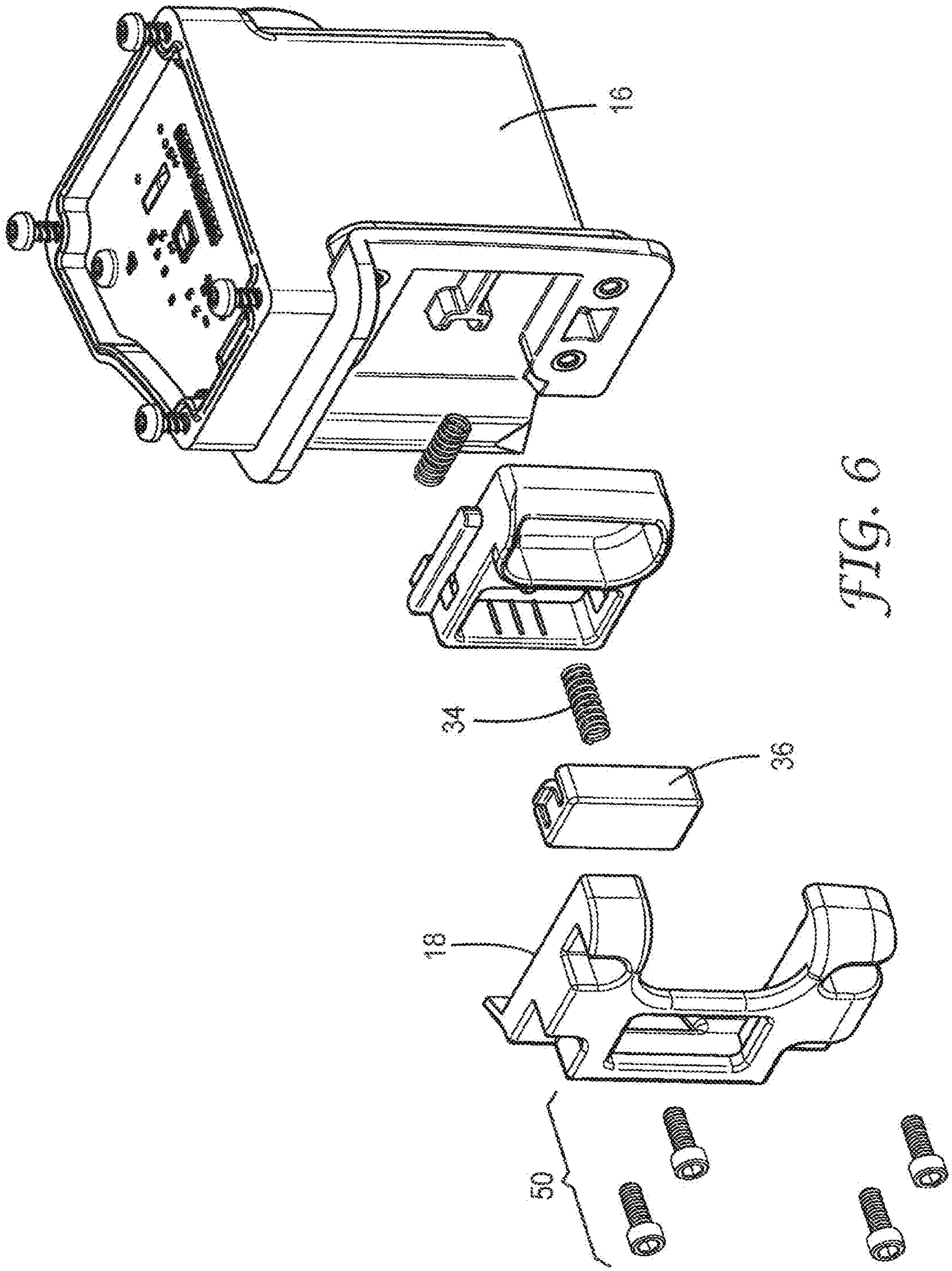
FIG. 6 is an exploded view of the housing and latching mechanism of FIGS. 1-5.

Now referring to FIGS. 4A, 4B, and 5, the camera assembly 38 is sized and configured to be fully disposed within the housing 16. The camera assembly 38 may include a camera 44 having a lens 28 configured to capture an image, and at least one circuit board 46 coupled to the camera 44. As a non-limiting example, the camera 44 may be configured to capture at least one of a thermal image, visible light image, and infrared (IR) image.

The at least one circuit board 46 may include processing circuitry 48 having a processor and a memory in electrical communication with the processor. In particular, in addition to or instead of a processor, such as a central processing unit and memory, the processing circuitry 48 may include integrated circuitry for processing and/or control, e.g., one or more processors and/or processor cores and/or FPGAs (Field Programmable Gate Array) and/or ASIC's (Application Specific Integrated Circuitry) adapted to execute instructions. The processor may be configured to access (e.g., write to and/or read from) the memory, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Further, memory may be configured as a storage device that is configured to store images captured by the camera 44 and perform one or more operations or functions such as, for example, wirelessly transmitting (via Wi-Fi connection, Bluetooth®, or near-field communication (NFC)) the stored images to an external control unit or device (not shown). The image capture device 12 may also include software stored internally in, for example, the memory, or stored in external memory (e.g., database, storage array, network storage device, etc.) and may be accessible by the image capture device 12 via an external connection. The software may be executable by the processing circuitry 48.

It is to be understood that the camera 44 and lens 28 are configured to capture and record audio and/or video for storage within the memory, or for real-time transmittal to an external control unit, monitoring center, or device.

In one or more embodiments, the at least one circuit board 46 may include a plurality of circuit boards each coupled to the camera assembly at different portions of the camera 44 that do not interfere with the field of view of the lens 28. In some such embodiments, a single circuit board may include the processing circuitry 48, or the processing circuitry may be spread across the two or more of the plurality of circuit boards. The circuit boards 46 may each be coupled or affixed to the camera by one or more fasteners 50 such as, for example, a screw. Each circuit board 46 may be spaced apart from an adjacent circuit board 46 such as to prevent unintended touching or contact between any two circuit boards. In other embodiments, the at least one circuit board 46 may include a rigid-flex circuit board that is configured to wrap around one or more portions of the camera 44 that do not interfere with the field of view of the lens 28.

Further, the camera assembly 38 may also include an orientation sensor and an accelerometer. The orientation and accelerometer are disposed in communication with the processing circuitry 48 and may be affixed to the circuit board 46. The orientation sensor may be configured to detect and determine an orientation of the camera, and rotate the captured image based on the determined orientation. The orientation of the camera may be detected and determined both when the image capture device 12 is coupled to the adapter 14, and when the image capture device 12 is not coupled to the adapter 14. The accelerometer may be in electrical communication with the processing circuitry 48 and is configured to detect a haptic input (for example, a hand gesture or other bodily movement of a user) and transmit a signal associated with the haptic input to the processing circuitry. The processing circuitry 48 may then associate the signal with a predetermined command and/or determine whether to relay the signal to an external command unit or device. For example, the predetermined command may be a command to turn off the camera 44, to turn off or on a light source that may be included within the image capture device 12, to take a photograph or snapshot the FOV, and/or switch between image-capturing, audio-capturing, or video-capturing modes. Additionally, the accelerometer may include a timer to in electrical communication with the processing circuitry 48 such that the accelerometer may trigger an automatic shut off of the image capture device 12 after a predetermined time interval or duration.

According to one or more embodiments, the image capture device 12 may also include one or more microphones (not shown) to detect and evaluate external audio signals from the environment. The microphones may be in communication with the processing circuitry 48 so that the detected audio signals can be filtered to eliminate ambient noise from the audio signal before it is stored within the memory.

According to one or more embodiments, the image capture device 12 may also include an internal battery disposed within the housing 12. The internal battery may be a rechargeable battery that is configured to be in electrical communication with an external power supply. The internal battery may be charged through the use of a physical charging cable to the external power supply, or wirelessly charged through the use of electromagnetic induction. In embodiments, using a physical wire to charge the internal battery, the image capture device may have a charging port 56 (shown in FIG. 2B) that may be used to couple the charging cable to the internal battery. The charging port 56 may be a custom charging port or use a standard connection such as, for example, a Universal Serial Bus (USB), USB Type-C (USB-C), or Micro USB connection. However, it is to be understood that other standard connections may also be used.

Additionally and/or alternatively, the image capture device 12 may also be configured to be charged via a mountable battery pack. A portion of the mountable battery pack may be sized and configured to be received by the charging port 56. In some embodiments, the mountable battery pack may also include the adapter 14 that allow for the battery pack to be releasably affixed to the image capture device 12 while still connected to the charging port 56.

It is contemplated that the image capture device 12 can be removably mounted to different accessories such as, but not limited to, a drone, a robot, a mobile light tower (such as may be found on first responder equipment) and other aerial applications. It is also contemplated that the image capture device 12 can be removably mounted to a hand-held device such as a handle having a self-contained battery and display and even an extension stick/pole with or without a display.

Such arrangements allow a single image capture device 12 to be used in different applications. For example, fewer image capture devices 12 may be needed than SCBA masks since not all masks might be in use in a given shift. This avoids the 1:1 image capture device 12 to mask ratio that is required when image capture devices are permanently mounted to or integrated with the protection equipment, e.g., mask.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the present embodiments are not limited to what has been particularly shown and described herein above. In addition, unless mention was made above to the contrary, it should be noted that all of the accompanying drawings are not to scale. A variety of modifications and variations are possible in light of the above teachings.

The invention claimed is:

1. A mounting system for an image capture device, the mounting system comprising:
- an adapter having a first mating member;
- a housing releasably coupled to the adapter, the housing including a latching mechanism having:
- a second mating member sized and configured to receive the first mating member of the adapter when the housing is coupled to the adapter;
- a biasing element projecting from an outer surface of the housing, the biasing element being movably coupled to the housing and transitionable between a first disengaged position and a second engaged position; And
- wherein the first mating member defines a groove, and the second mating member is sized and configured to be slidably received within the groove when the biasing element is in the second engaged position.

2. The mounting system of claim 1, wherein when received within the groove, the second mating member is releasably locked into place when the biasing element transitions to the first disengaged position.

3. The mounting system of claim 1, further including a boot sized and configured to at least partially encase the housing, the boot being composed of a thermally-resistant material.

4. The mounting system of claim 1, further including an image capture device disposed within the housing, the housing defining an aperture that circumscribes a lens of the image capture device.

5. An apparatus, comprising:

a housing including:

a latching mechanism, the latching mechanism having a second mating member sized to receive a first mating member;

a camera assembly sized and configured to be fully disposed within the housing, the camera assembly including:

a camera;

a boot sized and configured to at least partially encase the housing; and an inner surface of the boot and an outer surface of the housing defining a gap therebetween.

6. The apparatus of claim 5, further including at least one printed circuit board coupled to the camera and retained within the housing.

7. The apparatus of claim 5, wherein at least one of the boot and the housing is composed of a thermally-resistant material.

8. The apparatus of claim 5, wherein:

the camera includes a lens; and the boot and the housing each define an aperture configured to circumscribe the lens.

9. The apparatus of claim 5, wherein the camera is one of a thermal camera, a visible light camera, and an infrared (IR) camera.

10. The apparatus of claim 5, further including a biasing element projecting from an outer surface of the housing, the biasing element being movably coupled to the housing and transitionable between a first disengaged position and a second engaged position.

11. A camera assembly for an image capture device, the camera assembly comprising:

a camera including a lens configured to capture an image, the image being one of:

a thermal image;

a visible light image; and an infrared (IR) image; and an orientation sensor configured to:

determine an orientation of the camera; and rotate the captured image based on the determined orientation.

12. The camera assembly of claim 11, further including:

at least one circuit board coupled to the camera, the at least one circuit board includes one of:

a plurality of circuit boards spaced apart from each other; and a single rigid-flex circuit board.

13. The camera assembly of claim 11, further including:

processing circuitry having:

a processor; and a memory in electrical communication with the processor and configured to store the image; and an accelerometer in electrical communication with the processing circuitry, the accelerometer is configured to detect a haptic input and transmit a signal associated with the haptic input to the processing circuitry.

* * * * *